(12) United States Patent
Baudat et al.

(10) Patent No.: US 6,899,215 B2
(45) Date of Patent: May 31, 2005

(54) CURRENCY VALIDATOR

(75) Inventors: Gaston Baudat, Geneva (CH); Fatiha Anouar, Exton, PA (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 10/013,995

(22) Filed: Dec. 11, 2001

(65) Prior Publication Data

US 2002/0117375 A1 Aug. 29, 2002

(30) Foreign Application Priority Data

Dec. 15, 2000 (EP) .............................................. 00311253

(51) Int. Cl.$^7$ .............................. C07D 5/08; G06K 9/00
(52) U.S. Cl. ....................... 194/328; 194/302; 382/135; 382/136; 382/137; 382/225
(58) Field of Search ................................. 194/328, 302, 194/206, 207, 317; 382/135, 136, 137, 181, 197; 387/225; 198/205, 206; 196/207

(56) References Cited

U.S. PATENT DOCUMENTS

| | | | | |
|---|---|---|---|---|
| 4,733,765 A | * | 3/1988 | Watanabe | 194/206 |
| 5,353,905 A | | 10/1994 | Yokomori | 194/317 |
| 5,757,001 A | * | 5/1998 | Burns | 250/339.11 |
| 6,128,402 A | * | 10/2000 | Jones et al. | 382/135 |
| 6,298,171 B1 | * | 10/2001 | Lorton et al. | 382/278 |
| 6,580,819 B1 | * | 6/2003 | Rhoads | 382/135 |
| 6,588,571 B1 | * | 7/2003 | Baudat | 194/328 |

FOREIGN PATENT DOCUMENTS

| | | |
|---|---|---|
| EP | 0 887 761 A2 | 12/1998 |
| GB | 2254949 | * 10/1992 |
| GB | 2 344 446 A | 6/2000 |

OTHER PUBLICATIONS

Campbell, C., "Radial Basis Function Networks: Design and Applications", Chapter 7, *An Introduction to Kernel Methods*, Springer Verlag, Berlin, 2000, pp. 155–192.
Burges, Christopher J.C., "A Tutorial on Support Vector Machines for Pattern Recognition", Jun. 1998, pp. 121–167.
Burges, Chris J.C., "Simplified Support Vector Decision Rules", Jul. 3, 1996, pp. 71–77.
Baudat, G. et al., "Generalized Discriminant Analysis Using a Kernel Approach", Oct. 2000, pp. 2385–2404.
Mackay, David J.C., "Introduction To Gaussian Processes", May 18, 1998, pp. 1–32.
Scholkopf et al., "Input space versus feature space in kernel-based methods," IEEE Transactions on Neural Networks 10(5):1000–1017, Sep. 1999.

* cited by examiner

*Primary Examiner*—Andrew J. Fischer
(74) *Attorney, Agent, or Firm*—Fish & Richardson P.C.

(57) ABSTRACT

A method of deriving a classifying function for classifying items of currency includes deriving a plurality of measurements from at least one currency sensor and a plurality of currency items, and forming a set of data from the measurements, the elements of the data set corresponding to points in a first space, and determining a set of values corresponding to the measured values. The method also includes selecting a kernel function corresponding to a mapping of the first space to a second space, the method including deriving an expression representing the function of the measured values in terms of the kernel function and using it to derive a classifying function.

23 Claims, 9 Drawing Sheets

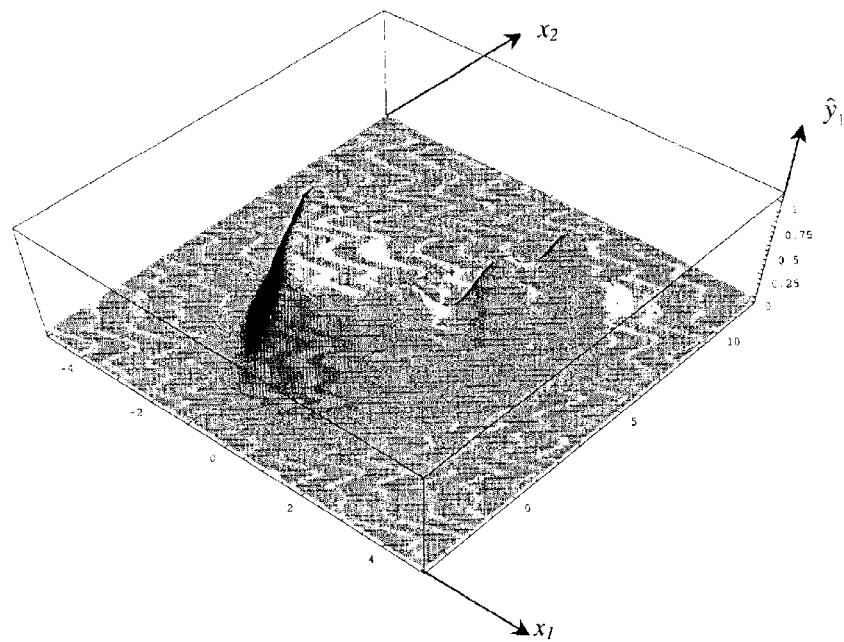
Figure 7
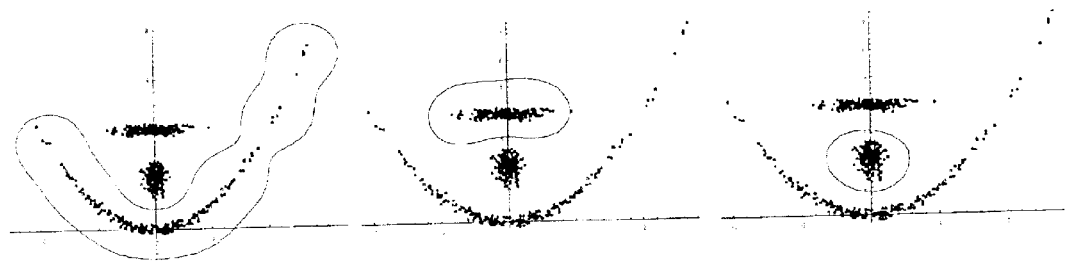
Figure 8    The three decision boundaries assuming a threshold of 0.5

CURRENCY VALIDATOR

The invention relates to currency validators and methods for adapting and operating currency validators. In this specification, the terms currency and currency items are intended to include coins, tokens and the like, banknotes and bills, other value sheets such as cheques, vouchers, bonds, and includes both genuine items and counterfeits, such as slugs and washers.

There are many known methods for determining the denomination of a currency item and distinguishing between genuine and fake currency items. Commonly, a currency item is sensed by one or more sensors, such as electromagnetic or optical sensors, to produce signals representative of certain characteristics of the currency item, such as coin thickness, coin material, or the pattern on a banknote. Those measured signals are then compared with stored reference data representative of known currency items, and, depending on the outcome of the comparison, the measured currency item is classified, for example, as a genuine currency item of a particular denomination, a known fake, or simply as unknown.

For example, it is known to store reference data for known currency items in the form of sets of "windows", which consist of upper and lower limits. If each of the measured signals for a particular item falls within each of the corresponding windows for a particular denomination, it is classified as belonging to that particular denomination. This approach can be viewed generally as using boundaries in the space having axes corresponding to the measured characteristics, known as acceptance boundaries, which are linear (or the equivalent in higher dimensions). Various developments of that approach are known, such as described in GB 2 238 152A.

Usually, distributions of populations of particular denominations of currency items are non-linear, in which case, linear acceptance boundaries may not be sufficiently accurate to distinguish between different denominations. Another known method stores reference data which describe elliptical boundaries corresponding to specific denominations of currency items. Similarly to the approach mentioned above, measured currency items are classified according to whether or not the measured characteristics fall within or outside those elliptical boundaries. Such a method is described in, for example, GB 2 254 949A.

In many cases, the boundaries between different denominations of currency items are complicated and cannot be reflected sufficiently accurately by linear or elliptical boundaries. Known techniques for finding non-linear acceptance boundaries can result in less than ideal results for currency validators. Clearly, it is particularly important to be able to classify and validate items of currency accurately, for example, in a vending machine, where there is potential loss of revenue. In such cases, it is known to use neural networks to perform currency classification, as described, for example, in EP 0 671 040A.

The present invention provides a method of deriving a function for use in connection with a currency validator, or document sensor, the method comprising deriving a plurality of measurements from at least one sensor and a plurality of items, and forming a set of data from the measurements, the elements of the data set corresponding to points in a first space, selecting a kernel function corresponding to a mapping of the first space to a second space, the method comprising selecting a subset of the data set where the subset is such that the image of the subset under the mapping in the second space is representative of the image of the data set under the mapping in the second space.

The invention also provides a method of deriving a function for use in connection with a currency validator or document sensor, the method comprising deriving a plurality of measurements from at least one sensor and a plurality of items, and forming a set of data from the measurements, the elements of the data set corresponding to points in a first space, and determining a set of values corresponding to the measured values and representing a function of the measured values, selecting a kernel function corresponding to a mapping of the first space to a second space, the method comprising deriving an expression representing the function of the measured values in terms of the kernel function.

Preferably, the invention is used to derive a classifying function. Alternatively, the invention may be used to derive a "signature" function, representing characteristics and behaviour of a particular validator, with respect to a reference. A signature function may itself be used in the context of a classifying function.

Other aspects of the invention are as set out in the accompanying independent claims.

In general terms, a first aspect of the invention relates to a method of approximating a function using a set of data and corresponding values representing the function, the method comprising choosing a kernel function corresponding to a mapping of the first space containing the measurements to a second space, and deriving an expression representing an approximation of the function in terms of the kernel function. The invention is particularly useful when the function to be approximated is a non-linear function. Thus, in general terms, the first aspect of the inventin can be viewed as a method of performing non-linear regression on data in a first space by considering the image of the data in a second space and performing a simpler regression, preferably linear regression, in the second space.

Preferably, the data is obtained from an item sensor, such as a currency sensor. Preferably, the methods of the invention are used to derive a function for use in manufacturing, adapting or operating a device such as a currency validator. For example, such a function may be a classifying function, or a function representing a signature of a validator or group of validators. Various other functions arise in the context of currency and currency validators, and the invention can be used to derive approximations of those functions and to use them, for example, in currency validators.

Also, in general terms, a second aspect of the invention the invention relates to a method of analysing a set of data using a kernel function corresponding to a mapping of a first space comprising the data set to a second space, the method comprising selecting a subset of the data set where the subset is such that the image of the subset under the mapping in the second space is representative of the image of the data set under the mapping in the second space, and analysing the data using said subset.

Preferred features of the invention expressed above are as set out in the dependent claims.

As a result of the invention, better, more accurate results, especially in classification, can be obtained, compared with the prior art approaches.

Embodiments of the invention will be described with reference to the accompanying drawings of which:

FIG. 4b is a graph showing error values corresponding to FIG. 4a;

FIG. 7 is a 3-d graph corresponding to FIG. 5;

FIG. 8 is a group of graphs showing decision boundaries for the clusters shown in FIG. 5;

Figure 1:
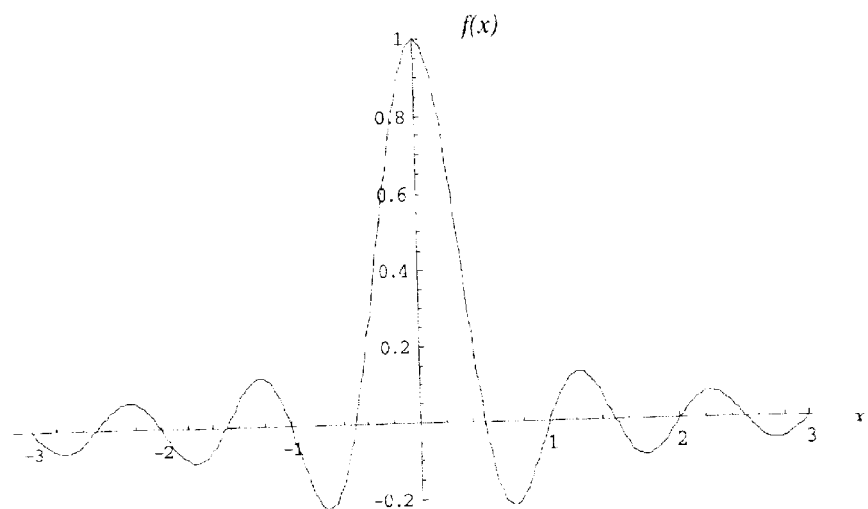
FIG. 1 is a graph of a sinc ($2\pi x$) function.
Figure 5:
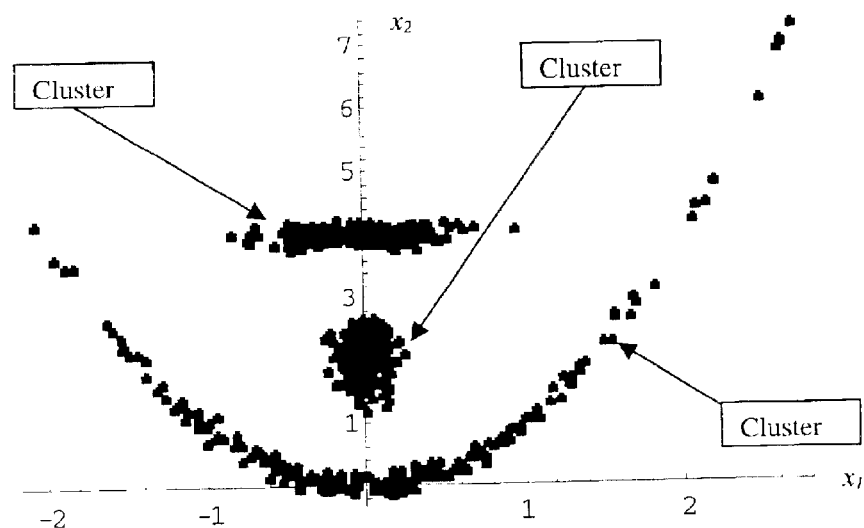
FIG. 5 is a graph showing cluster data.
Figure 10:
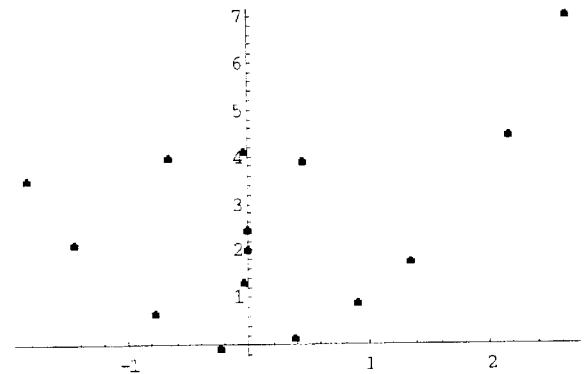
Figure 11:
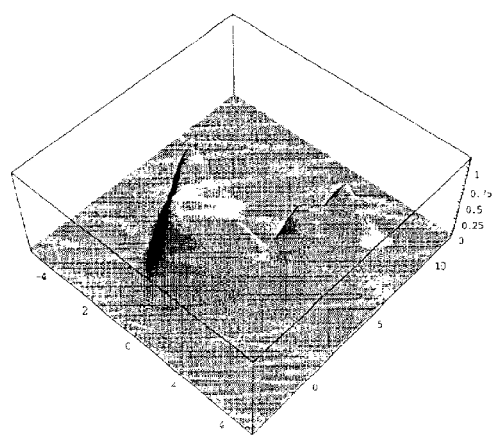
Figure 12:
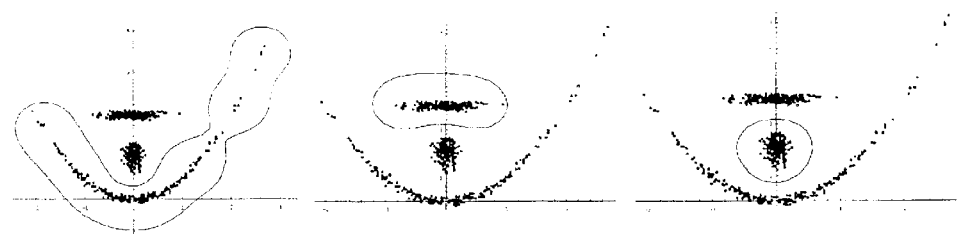
Figure 13:
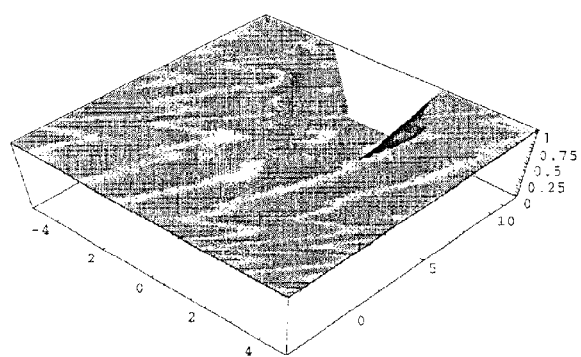
Figure 14:
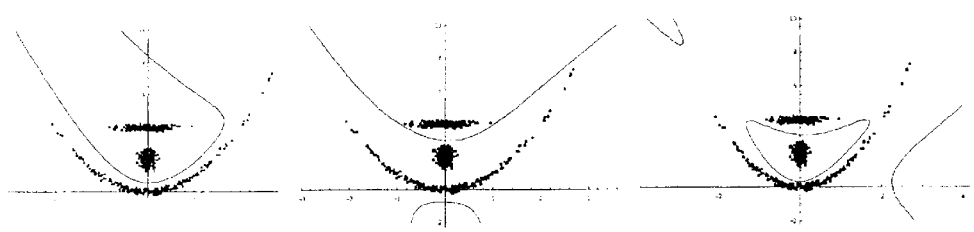
Figure 15:
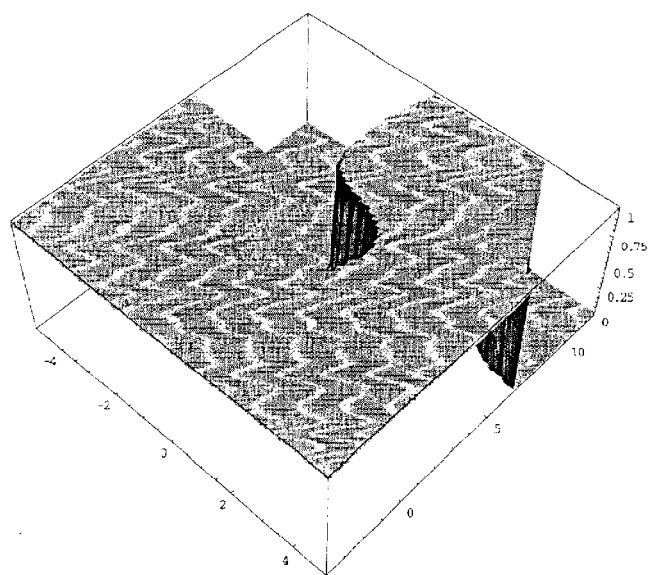
Figure 16:
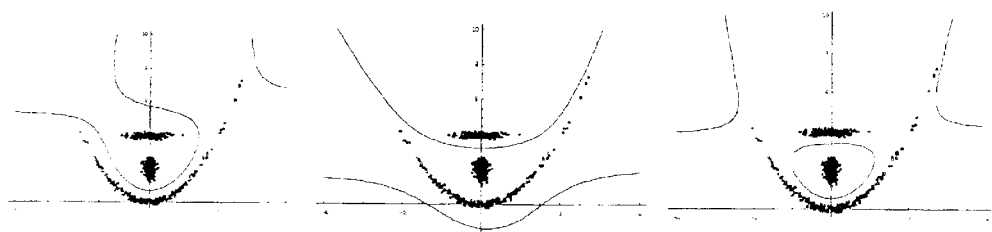
Figure 17:
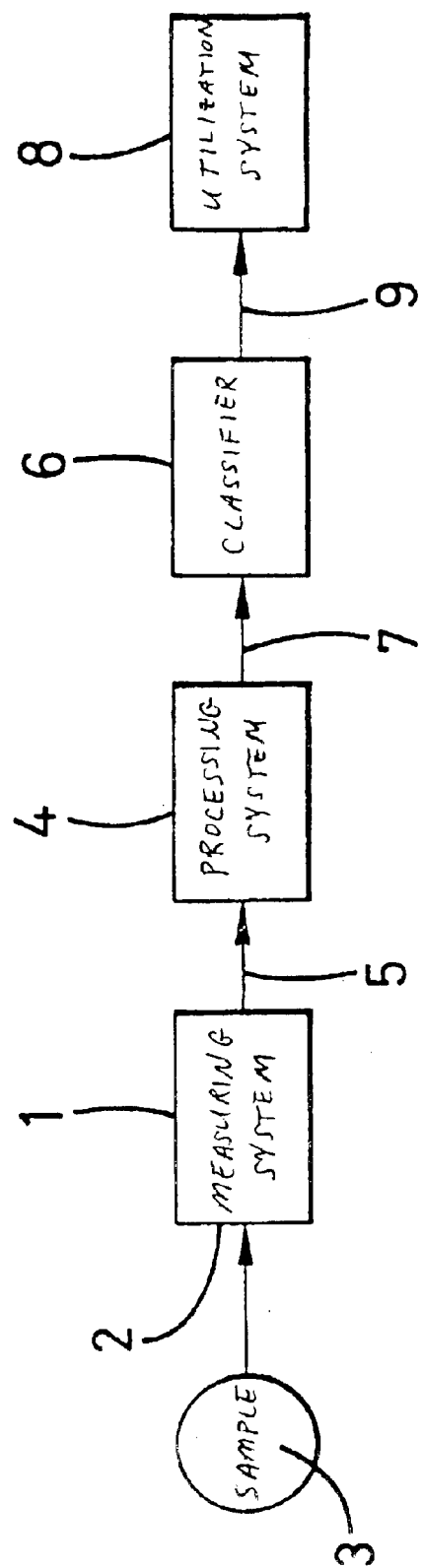

FIG. 9*a* is a graph of another approximation of the function of FIG. 1;

FIG. 9*b* is a graph showing error values corresponding to FIG. 9*a*;

FIG. 10 is another graph showing selected elements of the cluster data of FIG. 5;

FIG. 11 is another 3-d graph corresponding to FIG. 5;

FIG. 12 is another group of graphs showing other decision boundaries for the clusters of FIG. 5;

FIG. 13 is another 3-d graph corresponding to FIG. 5;

FIG. 14 is another group of graphs showing more decision boundaries for the cluster of FIG. 5;

FIG. 15 is another 3-d graph corresponding to FIG. 5;

FIG. 16 is another group of graphs showing more decision boundaries for the clusters of FIG. 5;

FIG. 17 is a block diagram of a coin validator.

According to a preferred embodiment, the present invention uses kernel functions to analyse data derived from currency items and currency sensors to derive classification functions, or acceptance boundaries, for validators. More particularly, the data is measured data derived from currency items, such as coins and banknotes, the data being representative of characteristics of currency items, such as coin thickness, material, weight, width or the pattern on a banknote.

We shall begin with a generalised description of the theory underlying the invention, with reference to relatively simple data distributions, for clarity and ease of understanding. The invention will then be described in more detail in relation to embodiments relating to classification and validation of currency items.

A first aspect of the invention relates to the use of kernel functions to derive an approximation of a function between sets of variables. This aspect of the invention can be extended to use of kernel functions to derive classification functions and methods of performing classification, especially for currency items.

A second aspect of the invention relates to the use of kernel functions to select a subset from a set of data, the subset being representative of the data set, in the context of the kernel function approach. More particularly, the subset is representative of the data set in the image space of a mapping $\phi$ corresponding to a kernel function k. The second aspect of the invention enables data analysis using kernel functions to be performed using less data, which reduces the complexity of the analysis and thus, for example, reduces computing effort and consequently costs when deriving classification functions for currency validators. The second aspect of the invention can be used in connection with any data analysis approach using a kernel function, such as kernel Generalised Discriminant Analysis, as described in our co-pending application, WO 00/33262, the contents of which are incorporated herein by reference, or kernel Principal Component Analysis (see "Non-linear component analysis as a kernel eigenvalue problem" by Scholkopf, Smola and Muller, Neural Computation 10, 1299-1319 (1998)). The second aspect of the invention is described in detail here in association with the first aspect of the invention.

In the following, underlining is used to indicate vector quantities, and the term vector is generally intended to include scalar quantities (ie a vector of 1 dimension).

First, we shall describe the selection of a representative subset of a set of vectors, reflecting the second aspect of the invention mentioned above.

Let X be a set of vectors, of size M.

$$X = \{\underline{x}_1, \underline{x}_2, \ldots, \underline{x}_M\}$$

Suppose that we map any vector from the input space X to a Hilbert space F through a nonlinear mapping function $\phi$:

$$\phi: X \to F$$

$$\underline{x} \to \phi(\underline{x})$$

Let S be a subset of X of size L $$S = \{\underline{x}_{s,1}, \underline{x}_{s,2}, \ldots, \underline{x}_{s,L}\}$$

We assume that there is a subset S which can approximate, or reconstruct, the image of the elements of X in F. In other words, S acts like a base expressing X in F space.

$$\text{Thus, } \hat{\phi}(\underline{x}_i) = \sum_{j=1}^{L} a_{ij} \phi(\underline{x}_{s,j}) \forall i \quad (1)$$

($\hat{\phi}(\underline{x}_i)$ is the approximation of $\phi(\underline{x}_i)$ using the image of S in F.)

To simplify let us use the following notation:

$$\underline{\phi}_i = \phi(\underline{x}_i)$$

$$\underline{\phi}_{s,i} = \phi(\underline{x}_{s,i})$$

then equation (1) can be written as:

$$\hat{\underline{\phi}}_i = \Phi_S \cdot \underline{a}_i \; \forall i \quad (2)$$

With $$\Phi_S = |\underline{\phi}_{s,1}, \underline{\phi}_{s,2}, \ldots, \underline{\phi}_{s,L}|$$

a matrix formed from the image of S in F.

$$\underline{a}_i = [a_{i1}, a_{i2}, \ldots, a_{iL}]^t$$

a vector which expresses $\underline{\phi}_i$ using the image of S in F.

We wish to find values for $\underline{a}_i$ that minimize the relative differences $\delta_i$ between the image of the $i^{th}$ element of X, $\underline{\phi}_i$ and its reconstruction using the S set, $\hat{\underline{\phi}}_i$.

$$\underline{d}_i = \underline{\phi}_i - \hat{\underline{\phi}}_i$$

$$\delta_i = \frac{\|d_i\|^2}{\|\phi_i\|^2} = \frac{(\underline{\phi}_i - \Phi_S \cdot a_i)^t \cdot (\underline{\phi}_i - \Phi_S \cdot a_i)}{\underline{\phi}_i^t \cdot \underline{\phi}_i} \quad (3)$$

$$\delta_i = 1 + \frac{a_i^t (\Phi_S^t \Phi_S) a_i - 2 a_i^t \Phi_S^t \underline{\phi}_i}{\underline{\phi}_i^t \cdot \underline{\phi}_i}$$

Minimization of the $\delta_i$ leads to:

$$\frac{\partial \delta_i}{\partial a_i} = \frac{2(\Phi_S^t \Phi_S) a_i - 2\Phi_S^t \underline{\phi}_i}{\underline{\phi}_i^t \cdot \underline{\phi}_i} = 0$$

or $$\underline{a}_i = (\Phi_S^t \Phi_S)^{-1} \Phi_S^t \underline{\phi}_i \quad (4)$$

$(\Phi_S^t \Phi_S)^{-1}$ exists if the elements of the image of S in F are linearly independent. In other words, the rank of $\Phi_S$ is L.

Using the equations (3) & (4) we can write:

$$\delta_i = 1 - \frac{\phi_i^t \Phi_S (\Phi_S^t \Phi_S)^{-1} \Phi_S^t \phi_i}{\phi_i^t \cdot \phi_i} = \sin^2(\beta_i) \quad (5)$$

Where $\beta_i$ is the angle between the vectors $\phi_i$ and $\hat{\phi}_i$, this implies we have minimized $|\beta_i|$ too.

Introducing now the kernel notation:

$$k(\underline{x}_p, \underline{x}_q) = \phi_p^t \phi_q$$

then equation (5) can be expressed as $$\delta_i = 1 - \frac{K_{s,i}^t \cdot K_{s,s}^{-1} \cdot K_{s,i}}{k(\underline{x}_i, \underline{x}_i)} \quad (6)$$

where $$K_{s,s} = [k(\underline{x}_{s,p}, \underline{x}_{s,q})]_{\substack{p=1,\ldots,L \\ q=1,\ldots,L}}$$

which is a L×L square matrix of the dot products of the image of S in F.

$$K_{s,i} = [k(\underline{x}_{s,j}, \underline{x}_i)]_{j=1,\ldots,L^t}$$

which is a vector of the dot products between the images of S and $\underline{x}_i$ in F.

As is known, and expressed above, the kernel function k expresses the dot product in F in terms of X.

Minimizing $\delta_i$ can be performed by maximizing:

$$J_i = \frac{K_{s,i}^t \cdot K_{s,s}^{-1} \cdot K_{s,i}}{k(\underline{x}_i, \underline{x}_i)} \quad (7)$$

$J_i$ can be considered as a local fitness function estimating the quality of the reconstruction for the element $\underline{x}_i$.

A suitable set S is constructed using a heuristic approach. In one example, this is done using a global fitness function $J_S$ which represents how closely the image of S represents all of the image of X in F. An example of a global fitness function is:

$$J_S = \frac{1}{M} \left[ \sum_{x_i \notin S} \left( \frac{K_{s,i}^t \cdot K_{s,s}^{-1} \cdot K_{s,i}}{k(\underline{x}_i, \underline{x}_i)} \right) + L \right] \quad (8)$$

In more detail, an example of how S is constructed is as follows.

Firstly, the element of X which gives the best global fitness result is selected. In other words, the element is chosen which has the largest global fitness value $J_S$ using equation (8) in this example. Alternatively, a first element can be chosen at random, or by inspection, to form the first element of S, $x_{s,1}$.

Next, another element of X is chosen and made a temporary member of S, and the value of $J_S$ is calculated on that basis for all the other elements of X. Then the temporary member of S is replaced by another member of X and $J_S$ is calculated again. Those steps are repeated for all the remaining elements of X. The element of X for which the global fitness function is a maximum is chosen as the permanent second member of S.

The steps set out in the previous paragraph are repeated to find subsequent members of S, each time looking for the highest value of the fitness function. The procedure is stopped when the fitness function exceeds a predetermined value. Alternatively, the procedure stops when S has a predetermined number of elements, or when S is a complete basis for the image of X in F. It is necessary to check the rank of the $K_{S,S}$ matrix to make sure it is possible to invert it.

Other more complex heuristics can also be used. Also, alternative fitness functions can be used. For example, the global fitness function can use the mean, the median or the minimum of the local fitness function, or other strategies. Alternatively, the fitness functions, global and local, can, for example, be based on an "error", using equation (6), in which case, optimization of S is indicated by a reduction in the global error. In each case, however, a kernel expression, such as in equation (7) is used.

In this way, a subset S of X can be found where the image of all elements of X in F under a mapping $\phi$ can be expressed approximately as linear combinations of the images of elements of S in F.

The set S can be used to reduce the computation involved in various kernel function approaches for data analysis, such as kernel PCA and kernel GDA. We shall describe next how S is used in connection with a method of approximating a function using a kernel function approach, which we call kernel regression.

Let X and S be sets of vectors as defined above. Let us suppose that $f(\underline{x})$, $\underline{x} \in X$, is a function of the elements of X, and $f(\underline{x})$ is a scalar value. Then let $\underline{y}$ be a vector which expressed the expected or observed values of $f(\underline{x})$ for X. In other words, the ith component of $\underline{y}$ is $f(\underline{x}_i)$, for $1 \leq i \leq M$.

We assume that in F, the function f can be expressed approximately as a linear relationship. In other words, we assume there is approximately a linear relationship between $f(\underline{x})$ and $\phi(\underline{x})$.

Experience has shown that it is reasonable to assume a linear relationship between the image of X in F and $f(\underline{x})$, $\underline{x} \in X$, for a suitable choice of kernel, particularly as F may be an infinite space.

Assuming that linear relationship, then y can be estimated using a classical linear regression approach. Thus:

$$\hat{\underline{y}} = \Phi_X^t \cdot \underline{u} \quad (9)$$

Where:

$$\Phi_X = [\phi_1, \phi_2, \ldots, \phi_M]$$

is a matrix of the image of X in F and $\underline{u}$ is a vector which describes the linear relationship between X and $\hat{y}$.

Generally speaking, a linear regression is of the form $y_i = \underline{a} \cdot \underline{x}_i = b$, where a and b are constants estimated through the sample data set using, for example, the least mean square scheme (LMS). However, it is well-known to reduce such an equation to the form $y_i = \underline{a}'_i \cdot \underline{x}'_i$ by adding a constant component (bias) to the $\underline{x}_i$ vector, so that $\underline{x}_i$ becomes $\underline{x}'_i$, where $\underline{x}'_i = (x_{1i}, \ldots X_{Ni}, C)^T$ and $\underline{a}$ becomes $\underline{a}' = (a_1, a_2 \ldots a_N, a_{N+1})$, where $b = a_{N+1} C$.

As S is a good approximation of X in F, we can continue with S.

Then:

$$\underline{u} = \Phi_S \cdot \underline{\alpha} \quad (9a)$$

Where $\alpha$ is a vector of L parameters that we are going to optimize in order to get the best fitting.

Combining 9 and 9a gives us:

$$\hat{y} = (\Phi^t_X \cdot \Phi_S) \cdot \underline{\alpha} \tag{10}$$

Let us introduce again the kernel notation for the equation (10) and rewrite it:

$$\hat{\underline{y}} = K_{X,S} \cdot \underline{\alpha} \tag{11}$$

where $$K_{X,S} = [k(\underline{x}_p, \underline{x}_{s,q})]_{\substack{p=1,\ldots,M \\ q=1,\ldots,L}} \tag{11a}$$

a M×L matrix, formed from the cross-dot products between X and S.

Minimizing $$\|\underline{y} - \hat{\underline{y}}\|^2$$

in accordance with a classical "least squares" approach for linear regression gives us:

$$\underline{\alpha} = K_{X,S}^+ \cdot \underline{y} \tag{12}$$

Where $$K_{X,S}^+ = (K_{X,S}^t \cdot K_{X,S})^{-1} \cdot K_{X,S}^t \tag{12a}$$

is the pseudo-inverse, assuming $(K_{X,S}^t \cdot K_{X,S})$ can be inverted, which again implies that the rank of $\Phi_S$ must be L.

Using equation (10), for a new vector $\underline{z}$, its value $\hat{y}_z$ can be calculated as follows:

$$\hat{y}_z = \sum_{x_i \in S} \alpha_i \cdot k(\underline{x}_i, z) \tag{13}$$

where $\alpha_i$ is the ith element of the vector $\underline{\alpha}$ calculated in accordance with equation (12).

A similar approach can be applied where $f(\underline{x})$ is a vector. Let Y be a matrix of the expected values, each column being a individual $\underline{y}_k$ vector, where the $i^{th}$ component of the kth vector is the $k^{th}$ component of $f(\underline{x}_i)$ $$Y = [\underline{y}_1, \underline{y}_2, \ldots \underline{y}_N],$$

a M×N matrix, where each column is one individual $\underline{k}_k$ vector, and M is the dimension of $f(\underline{x})$.

$$A = [\underline{\alpha}_1, \underline{\alpha}_1, \ldots \underline{\alpha}_N]$$

a L×N matrix, each column is one individual $\underline{\alpha}_k$ vector.

The optimal linear solution for A comes using the pseudo-inverse too:

$$A = K_{X,S}^+ \cdot Y \tag{14}$$

Rearranging equation (13) we get for every $\hat{y}_{k,z}$:

$$\hat{y}_{k,z} = \sum_{x_i \in S} \alpha_{k,i} \cdot k(\underline{x}_i, z) \tag{15}$$

for a new vector $\underline{z}$.

Thus, equations (13) and (15) show how to derive approximate values of $f(\underline{z})$ for new values of $\underline{z}$ not in the original "learning" data sample set.

The following examples illustrate the kernel regression approach and the selection of a data subset described above. In the first example, both x and y=f(x) are scalar values. To illustrate the approach, we use a known function f(x)=sin (x)/x. In the example, Gaussian noise is added so that y=f(x)=sinc(2πx)+N(0,0.05). FIG. 1 shows the function y=sinc(2πx) (ie without noise).

Figure 2:
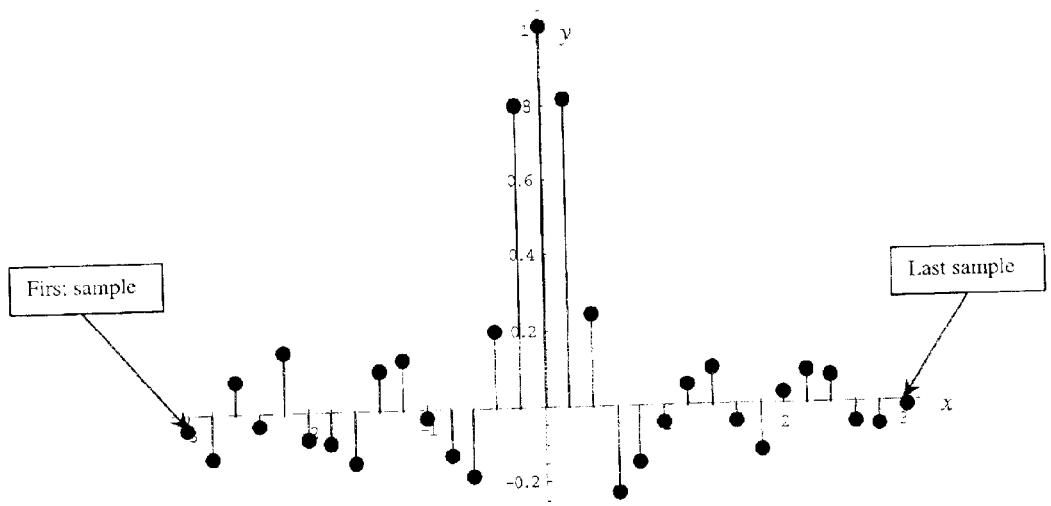
FIG. 2 is a graph showing samples of a function.

The data set X consists of samples of x distributed along the x axis, as shown in FIG. 2. FIG. 2 also shows the corresponding measured values of f(x) (ie with noise). In this example, there are 31 samples, so that X has 31 elements, or M=31.

First, the subset S of X is selected.

This is done using a Gaussian kernel $$k(x, y) = e^{-\frac{\|x-y\|^2}{\sigma}},$$

with σ=0.2, a fitness function $J_S$ as set out in equation (8) and a heuristic approach as set out above.

As a result, a set S={2, 4, 6, 9, 10, 12, 14, 17, 18, 20, 22, 24, 27, 28, 30} is found, where the number refers to the position of the corresponding sample in the X set, assuming that the elements in X are numbered in order of increasing value from the first sample (most negative) to the last sample (most positive). Here S has 15 elements (L=15) and $J_S$ is 0.91. While it is interesting to compare how the elements of S relate to the overall shape of f(x), note that f(x) is not used to determine S, and S consists of a set of 1-dimensional x values.

Figure 3:
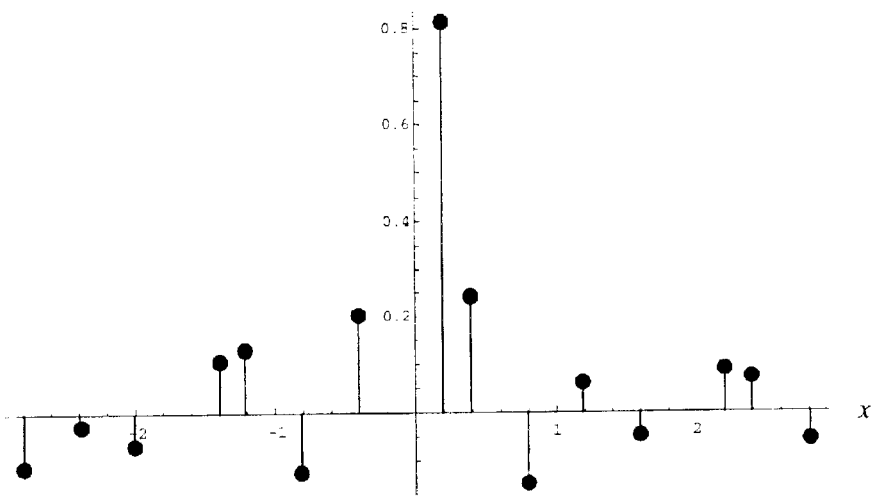
FIG. 3 is a graph showing a subset of the samples shown in FIG. 2.

FIG. 3 shows the selected elements, that is the elements of S, together with their associated values of f(x).

Next, we use the kernel regression approach described above, assuming that there is a linear regression between f(x) and the image of X in a space F under a mapping φ reflected by the Gaussian kernel we have chosen and used for the selection of S.

Firstly, we determine $K_{X,S}$, using equation (11a) and the X and S sets, and then calculate $K^+_{X,S}$ (see equation 12a). Next $\underline{\alpha}$, representing the linear regression, is calculated using the measured values of f(x) for each of the elements of X, to determine $\underline{y}$, and $K^+_{X,S}$ according to equation (12). Now, equation (13) can be used to determine the value of the approximation of f(x) for values of x, including new values. Note that equation (13) runs over $x_i \in S$, which reduces the amount of computation required compared with $x_i \in X$.

Figure 4A:
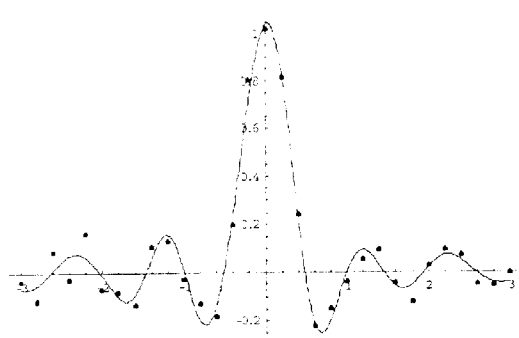
FIG. 4a is a graph of an approximation of the function of FIG. 1.
Figure 4B:
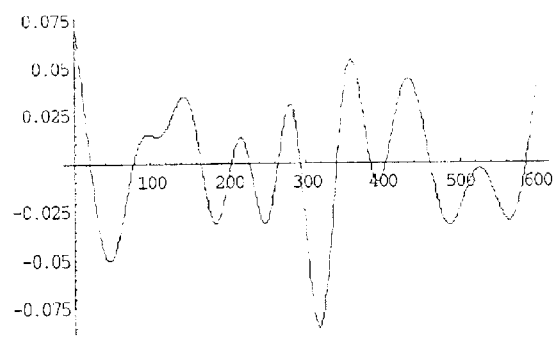

600 values of x evenly distributed along the x axis are selected and the corresponding values of $\hat{y}$ are calculated using equation (13). These points are plotted and joined to give a continuous function approximation, as shown in FIG. 4a. FIG. 4a also shows in bold the points corresponding to the X set with the associated originally measured values for y=f(x). FIG. 4b is a graph showing the difference between $\hat{y}$ and y=sinc(2πx) for each of the 600 x values.

The next example applies the kernel repression technique for classification.

FIG. 5 shows an array of data, which is in the form of three 2-D clusters.

Clusters Description

| | | |
|---|---|---|
| #1 | 200 samples | The two normal distributions are independent |
| $x_1$: | N(0, 1) | |
| $x_2$: | $x_1 * x_1 + N(0, 0.1)$ | |
| #2 | 200 samples | The two normal distributions are independent |
| $x_1$: | N(0, 0.3) | |
| $x_2$: | N(4, 0.1) | |

-continued

| #3 $x_2$: | 200 samples N(2, 0.3) | The two normal distributions are independent |
|---|---|---|

The X set has a total of 75 samples taken at random, 25 from each cluster (an eighth of the whole database).

The first step was to center and scale the X's data (means=0, and the standard deviations=1).

Selection of the S set was performed with a Gaussian kernel having a σ of 1. The equation (8) fitness function was used, and the selection stopped as soon as $J_S$ reached 0.99.

Figure 6:
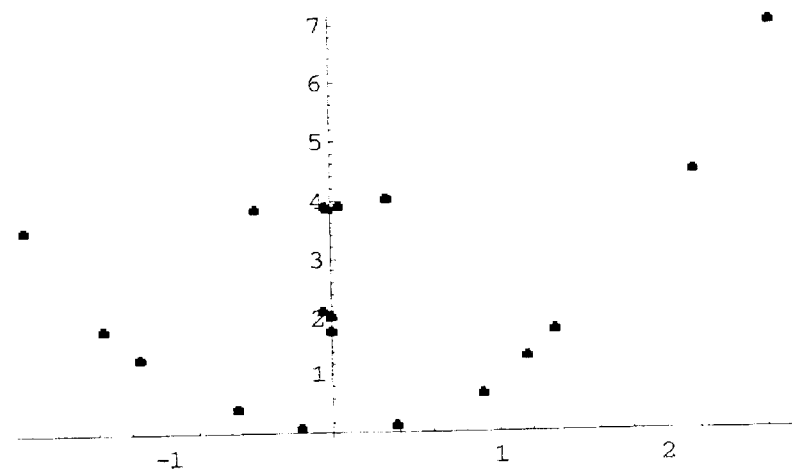
FIG. 6 is a graph showing selected elements of the cluster data of FIG. 5.

This resulted in a set S={4, 5, 6, 7, 10, 12, 13, 15, 1, 23, 25, 27, 31, 34, 42, 49, 52, 66, 68}, having 19 elements, where the number refers to the position of the element in X set. The elements of S are shown in FIG. 6.

The final FVS $J_S$ was 0.992.

It should be noted that the S set captures the "shape" of each cluster. In contrast with the previous example, the "shape" of the data in the S set is meaningful at least because the elements of X and S are 2-D. Note also that S contains 11 elements for the cluster #1, and only 8 from clusters #2 & #3.

For the purposes of classification according to the clusters apparent by inspection, we define a vector function on X and S as follows:

$$y_{k,i} = \begin{cases} 1 & \text{if } x_i \in k^{th} \text{ cluster} \\ 0 & \text{otherwise} \end{cases}$$

In this example, $1 \leq K \leq 3$, and we obtain three vectors $\underline{y}_1$, $\underline{y}_2$ and $\underline{y}_3$, each having 75 elements, the $i^{th}$ element of each $\underline{y}_k$ being as defined above.

Using the same kernel as for the selection of S, and equations (14) and (15), we obtain estimates for $$\underline{\hat{y}}_1, \underline{\hat{y}}_2, \text{ and } \underline{\hat{y}}_3,$$

each having 75 elements, the $i^{th}$ element of each $\underline{y}_k$ being as defined above.

Using the same kernel as for the selection of S, and equations (14) and (15), we obtain estimates for $$\underline{\hat{y}}_1, \underline{\hat{y}}_2, \text{ and } \underline{\hat{y}}_3$$

which can be viewed essentially as classification functions. In other words, if $y_k(\underline{z})$ is sufficiently "close to" (as may be separately defined) 1 for a given $\underline{z}=(x_1, x_2)$, then $\underline{z}$ belongs to cluster K, otherwise it does not.

FIG. 7 shows calculated values for $\hat{y}_1$, for various values of $(x_1, x_2)$.

Supposing we define the classification function using a threshold of 0.5. In other words, for z=$(x_1, x_2)$, let z∈cluster k if $\hat{y}_{k,z} \leq 0.5$. This corresponds to defining decision boundaries for the clusters in $(x_1, x_2)$ space.

FIG. 8 shows the decision boundaries for the three clusters in this example assuming a threshold of 0.5 for each $\hat{y}_i$.

We next describe an alternative approach, where instead of building S before performing the regression, the regression error is used to build S.

This approach can use a similar heuristic approach as previously described, but using the regression error as the fitness function.

The equation (16) expresses this error $\|\underline{d}_k\|^2$ for a given $\underline{y}_k$ vector. Equation (17) gives an example of a suitable fitness function $\epsilon_s$.

$$\underline{d}_k = \underline{y}_k - \underline{\hat{y}}_k$$

$$\underline{d}_k = \underline{y}_k - K_{X,S} \cdot (K_{X,S}{}^t \cdot K_{X,S})^{-1} \cdot K_{X,S}{}^t \cdot \underline{y}_k$$

$$\|\underline{d}_k\|^2 = \underline{y}_k{}^t \cdot (I - K_{X,S} \cdot (K_{X,S}{}^t \cdot K_{X,S})^{-1} \cdot K_{X,S}{}^t)^t \cdot (I - k_{X,S} \cdot (K_{X,S}{}^t \cdot K_{X,S})^{31\,1} \cdot K_{X,S}{}^t) \cdot \underline{y}_k$$

$$\|\underline{d}_k\|^2 = \|\underline{y}_k\|^2 - \underline{y}_k{}^t \cdot (K_{X,S} \cdot (K_{X,S}{}^t \cdot K_{X,S})^{-1} \cdot K_{X,S}{}^t) \cdot \underline{y}_k \quad (16)$$

$$\epsilon_s = \frac{1}{N} \cdot \sum_{k=1}^{N} \|\underline{d}_k\|^2 \quad \text{LMS error for multiple regression} \quad (17)$$

Here $\epsilon_s$ is an "error" fitness function, and we are therefore looking to minimise it.

In a third example, we use the alternative approach on the data of the first example.

Figure 9:
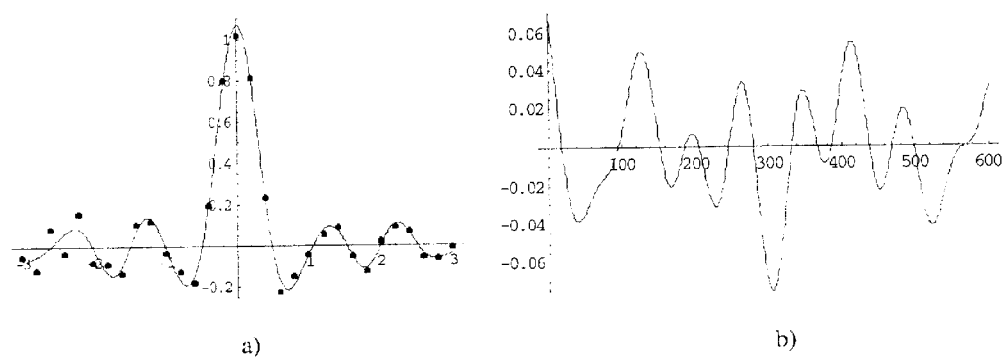

FIGS. 9a and 9b show the results with the same Sin(x)/x function as in the first example above. FIG. 9 shows the approximation of f(x) for 600 samples, and FIG. 9b shows the error between the approximation and y=sinc2πx/x for the examples.

S={1, 6, 8, 9, 10, 12, 14, 16, 19, 20, 22, 23, 25, 27, 28}, where the number refers to the position of the element in the X set, with a regression error of 0.00169 using the same Gaussian kernel (σ=0.2) as in the first example.

FIGS. 9a, 9b and FIGS. 4a, 4b are similar, which shows that the alternative approaches lead to very similar solutions.

Similarly, in a fourth example, we perform the alternative approach using the classification case of the second example with exactly the same 3 clusters. According to the equation (17) the heuristic was stopped as soon as the regression error reached 0.001 (same Gaussian kernel with σ=1).

This gives us S={1, 2, 6, 7, 9, 10, 13, 18, 23, 33, 36, 48, 52, 60, 73}, so L=15.

S is shown in FIG. 10.

This is also similar to the results of the second example. FIGS. 11 and 12 show the regression found for the cluster #1, and the three decision boundaries with a threshold of 0.5 for each $\hat{y}_i$.

It is very hard to find any differences between the FIGS. 7 & 11, or 8 & 12.

In the above examples, a Gaussian kernel is used. However, many other kernels can be used, such as the polynomial kernel k(x, y)=$[(x \cdot y)+c]^d$ where d is a natural number and c is a scalar, often +1. When d is 1 and c is 0 then we are back to a classic linear regression.

An other interesting kernel is the sigmoid, as is used for back propagation neural networks:

$$k(x, y) = \frac{1}{1 + e^{-\frac{x^t y}{\alpha}}}$$

where α is classically equal to +1.0 but can take other values.

Another kernel is the hyperbolic tangent, k(x, y)=tanh $[(x \cdot y)+\theta]$

In each case x and y may be vector or scalar quantities using again the bias technique, θ can be omitted.

There are many other kernel functions, satisfying Mercer's Theorem (see WO 00/33262), that represent dot products in F and can be used in the invention.

The spline kernel, where x and y are scalars, is another interesting example:

$$k(x, y) = 1 + x \cdot y + x \cdot y \cdot \text{Min}(x, y) - \frac{(x+y)}{2} \cdot [\text{Min}(x, y)]^2 + \frac{(\text{Min}(x, y))^3}{3}$$

As a fifth example, a sigmoid kernel $$k(x, y) = k(x, y) = \frac{1}{1 + e^{-\frac{x^t \cdot y}{a}}} \text{ with } a = 1,$$

was used on the cluster data of the second example, using the second approach. The resolution leads to S={1, 2, 3, 6, 8, 10, 18, 21, 23, 71}, L=10, for a regression error of 0.0033. FIG. 13 shows a graph of ŷ, where ŷ is hard limited in the range [0, 1], (that is, if $\hat{y}_1$ is less than zero, it is treated as zero, and if it is greater than 1 it is treated as 1), and thus shows the regression for the first cluster.

FIG. 14 shows the corresponding decision boundaries for each of $\hat{y}_1$, $\hat{y}_2$ and $\hat{y}_3$ with a threshold of 0.5.

It can be seen from FIG. 14 that the boundaries are not closed anymore; they reflect the sigmoid property and act like a back propagation neural network. It should be noticed that for the same regression error level we need fewer elements of S too (10 instead of 15, or even 19).

As a sixth example a $3^{rd}$ order polynomial kernel $k(x, y) = (x^t \cdot y)^d$ (d=3, C=0), was used on the cluster data. For this problem it is the least complex kernel which can still achieve the task with no classification error at all.

This gives us S={1, 6, 8, 9, 17, 21, 23, 33, 72}, L=9, for an regression error of 0.006. FIG. 15 shows the graph for $\hat{y}_1$, where $\hat{y}_1$, is hard limited in the range [0, 1].

FIG. 16 shows the corresponding decision boundaries for a threshold of 0.5.

The previous examples show good performances in generalization, which means they deal well with new vectors that were not in the original data set X.

To achieve this goal it is necessary to choose carefully the kernel, its parameter(s) (like σ), and the error level.

The choice of an appropriate kernel can be done by experimentation and trial and error, testing to see which give the best results for the data under analysis. Alternatively, the choice can be made using experience and inspection of the distribution of the data.

For example, for data having a polynomial-type distribution, a polynomial kernel can give good results. It is also necessary to choose carefully various parameters, such as σ in the Gaussian kernel, and the predetermined level for the fitness function. Again, experimentation, experience and the shape of the data are guides.

It is possible using kernels like Gaussian to find that all the X vectors are almost linearly independent in F (at least numerically).

When S=X the regression gives then a exact solution for all the learning samples, which means:

$Y = \hat{Y}$

As a matter of fact as soon as the rank of $K_{S,S}$ reaches M we have obviously $K_{S,S} = K_{X,X}$ and:

$A = K_{X,X}^{-1} \cdot Y$

But no error with the learning examples means often less good capabilities in generalization. We have started to learn the noise, which leads to overfitting. This is a classical problem; the solution comes from a tradeoff between learning error rate and the test error rate.

In the examples given above, the classification tasks have been done by multiple regression using binary functions (as our 3 clusters example above), which uses equations 14 & 15. An alternate possibility is to evaluate the clusters individually. In such an approach we have as many single regression as clusters (N). We assume for a given cluster that all the others just belong to a common one. Therefore we have a two classes classification problem. This dichotomic scheme could be especially helpful when using Gaussian kernels. For each cluster $C_i$ we compute a classification function (using single regression) between it and the others, but we select S only from $C_i$. Even if the optimization has been done with all data, the solution is described with those from $C_i$.

Which means the $C_i$ classification function does not share any data from other clusters, when for instance the back-propagation neural network uses the same set of weights to achieve all the classification functions. Therefore it is not possible to separate the weights by cluster and all of them are needed even for processing just one individual classification. On the other hand the KR allows how much data are considered for a subset of clusters to be minimised, because all that is needed for every individual classification function is known.

Using Gaussian kernels we have seen that results are very similar with this approach to those with the multiple regression. It should be noted that to work well we need to deal with RBF-like functions as the kernel.

According to the preferred embodiments of the invention, the general principles of the approaches described above are applied to currency items and currency validators. In other words, the approaches are applied to data that is derived from sensors for deriving measurements representative of characteristics of currency items. Referring to the second example, the axes of FIG. 5 could be considered to represent coin thickness and coin material of three different denominations of coin, or one genuine denomination and two fakes, although in fact the distributions shown in FIG. 5 may not necessarily be representative of real life distributions. In many cases, such as in a banknote validator, the dimension of the feature vector formed from combining measurements of the banknote is much higher than 3 and so cannot be shown pictorially.

An embodiment of the invention relates to a coin validator, as shown in block diagram form in FIG. 17.

In FIG. 17, box 1 designates a measuring system which includes an inlet 2, a transport system in a form of a coin inlet and coin transport path (not shown) for presenting a sample 3 and a sensor system (not shown) for measuring physical quantities of the sample. The measuring system 1 is connected to a processing system 4 by means of a data bus 5. Processing system 4 is connected to a classifier 6 by means of a data bus 7. The output of the classifier 6 is connected to a utilization system 8 by means of a data output bus 9. The utilization system 8 is in this example a vending machine, but may also be, for example, a money exchange machine.

The measuring system 1 measures features of an inserted coin 3. The measured features are assembled into a feature vector having n elements, where each element corresponds to a measured feature by the processing system 4. In the present example, the sensor system measures values representative of the material, thickness and diameter of an inserted coin, using known techniques (see, for example, GB 2 254 949 A) and those values are the three elements of the corresponding feature vector. Briefly, each sensor comprises one or more coils in a self-oscillating circuit. In the case of the diameter and thickness sensors, a change in the inductance of each coil caused by the proximity of an inserted coin causes the frequency of the oscillator to alter, whereby a digital representation of the respective property of the coin can be derived. In the case of the conductivity sensor, a change in the Q of the coil caused by the proximity of an inserted coin causes the voltage across the coil to alter, whereby a digital output representative of conductivity of the coin may be derived. Although the structure, positioning and orientation of each coil, and the frequency of the voltage applied thereto, are so arranged that the coil provides an output predominantly dependent upon a particular one of the properties of conductivity, diameter and thickness, it will be appreciated that each measurement will be affected to some extent by other coin properties.

Of course, many different features representative of items of currency can be measured and used as the elements of the feature vectors, using various sensors such as optical sensors, magnetic sensors and other types of sensors, as are well known in the art. For example, in the case of a banknote, the measured features can include, for example, the width of the note, the length of the note, and the intensity of reflected or transmitted light for the whole or part of the note. As an example, a measuring system can be arranged to scan a banknote along N lines using optical sensors. Each scan line contains L individual areas, which are scanned in succession. In each area, there are measurements of M different features. More specifically, for each area, measurements are made of the reflectance intensities of red, green and infra-red radiation. The total number of measurements for a banknote is therefore L×M×N. These measurements form the components of a feature vector for the respective specimen, so that the feature vector has L×M×N components. Alternatively, the measurements can be processed in a different way to obtain a feature vector representative of the measured specimen. For example, local feature vectors for each measured area can be formed made up of the M measurements for that area, so that each local feature vector has M components. The local feature vectors can then be summed over the area of the banknote to obtain an M dimensional feature vector representative of the entire specimen.

The feature vector is then input to the classifier 6. The classifier 6 determines whether the sample belongs to any one of predetermined classes, using the feature vector and predetermined classification criteria including a separating function. If the sample is identified as belonging to an acceptable denomination, then it is accepted and the corresponding value is credited. If the sample is identified as belonging to a known counterfeit group, it is rejected.

In this example, the system is for classifying two denominations of coins and one known counterfeit.

The derivation of the separating function will be described below.

The population distribution of the denominations are analysed as discussed below.

Initially, samples of each of the denominations of interest and each of the known counterfeit are measured and corresponding feature vectors are formed. The samples may be formed using the sensor system of the validator of interest, but in this embodiment, the samples are derived from a plurality of corresponding sensor systems, to take account of variations and manufacturing tolerances, in sensors systems in different validators as sold and installed in the field. The feature vectors from the samples, when plotted, for example, on a n-dimensional scatter graph, (where n is the number of measured features) fall roughly into clusters. These measured samples are then analysed and used to derive a separating function. In this example, 50 samples for each denomination and 50 samples of the counterfeit, are used and measured over 10 samples of sensor systems. The resulting cluster data is analysed and used to derive a classifying function, using the approach as described above in relation to example 2. The classifying function is then stored in a memory of the processing system 4 of a particular validator.

Classification for coins of an unknown denomination is then performed as follows. A coin is inserted into the validator. The inserted coin is sensed, and measurements representative of the material, thickness and diameter are obtained. The processing system then performs the following steps. A feature vector, z, is derived from the measured values. The values of $y_{k,z}$ are then calculated, using equation (15), and compared with a determined threshold value, here, 0.5. If $\hat{y}_{k,z}<0.5$, then the coin is deemed to belong to cluster K and is accepted or rejected accordingly.

According to this approach, the validator needs to store very little data (eg the data required in equation (15), that is S, K and $\alpha_{k,i}$ and the threshold) to perform the classification task to a high degree of accuracy. This reduces costs and computing effort and increases the speed of classification.

The analysis of the sample values for the initial data analysis and the derivation of the separating function can be done, for example, using a microprocessor. Similarly, the classifier 6 may be a microprocessor.

The methods of the embodiment described above are equally applicable to a banknote or other currency item or indeed to classification of other sorts of items that are sensed by an item sensor to produce measured values.

In the embodiment described above, a classification function for a currency validator is derived in accordance with the invention. The invention can also be used to deriving other useful functions, especially for use with currency validators. For example, the invention can be applied to derive a "signature" for a validator or group of validators. The signature data of a validator represent the characteristics of a validator or group of validators. The signature of a validator can be viewed, for example, as indicating the measurements that are to be expected from a given validator when it tests an item compared with the measurements obtained in a known validator for the item. For example, a particular validator may, because of the set up of the device, always give measurements that are twice the size of the corresponding measurements obtained from a known validator, and that is known as the signature. The present invention can be used to obtain a function representing the signature of a particular validator by analysing data obtained from measuring a plurality of currency items in the validator and comparing them with reference data, for example, obtained by measuring a plurality of currency items in another predetermined validator or group of validators which is or are used as a reference for determining the signatures of validators. The signature can be used when building the validator in the factory, or hen adapting it in the field, for example, to introduce a new coin into the acceptable coin set. The signature may be stored in the coin validator.

In the described embodiment, samples of the denominations of interest are used to derive the classifying function. Other items can also be used, such as tokens or washers.

In the examples given above, a linear regression is performed on F. It is also possible to perform other, non-linear, regressions, such as using quadratics, for example. Such techniques are more complicated than performing a linear regression, but may still be simpler than a regression based on X.

What is claimed is:

1. A method of deriving a classifying function for classifying items of currency, the method comprising:

deriving a plurality of measurements from at least one currency sensor and plurality of currency items, forming a set of data from the measurements, the elements of the data set corresponding to points in a first space and expressing a first function, selecting a kernel function corresponding to a mapping of the first space to second space, selecting a subset of the data set where the subset is such that the image of the subset under the mapping in the second space is representative of the image of the data set under the mapping in the second space, deriving an expression representing the first function in terms of the kernel function, and using the subset and the expression to derive the classifying function.

2. A method as claimed in claim 1 comprising deriving a set of values representing the first function as a linear relationship between the image of at least some members of the data set under the mapping.

3. A method as claimed in claim 1 wherein the first function of the measure values are scalar.

4. A method as claimed in claim 1 wherein the first function values are vectors.

5. A method as claimed in claim 1 which uses the relationship $$\hat{y}_{k,z} = \sum_{x_i \in S} \alpha_{k,i} \cdot k(x_i, z)$$

as hereinbefore defined, for vector or scalar quantities.

6. A method of deriving a classifying function for classifying items of currency, the method comprising deriving a plurality of measurements from at least one currency sensor and a plurality of items, and forming a set of data from the measurements, the elements of the data set corresponding to points in a first space, selecting a kernel function corresponding to a mapping of the first space to a second space, the method comprising selecting a subset of the data set where the subset is such that the image of the subset under the mapping in the second space is representative of the image of the data set under the mapping in the second space.

7. A method as claimed in claim 6 wherein the subset is such that the image of each element of the data set can be expressed approximately as a linear combination of the image of elements of the subset.

8. A method as claimed in claim 7 wherein the subset is such that a measurement of the approximation meets a predetermined condition.

9. A method as claimed in claim 6 wherein the stop of selecting a subset comprises:

(a) deriving a preliminary subset;

(b) adding temporarily at least one element from the data set to the subset to form a temporary subset;

(c) calculating the value of a fitness function representing the closeness of an approximation of the remaining elements of the data set in terms of the image often temporary subset;

(d) replacing the temporary elements in the temporary subset by other elements and repeating step (c); and (e) comparing the values of the fitness function for each temporary subset, and selecting the temporary subset for which the value of the fitness function indicates the closest approximation, and set the selected temporary subset as a preliminary subset.

10. A method as claimed in claim 9 in which steps (a) to (e) are repeated to form a sequence of preliminary subsets of increasing size.

11. A method as claimed in claim 9 wherein the steps (a) to (e) are repeated until a fitness function meets a predetermined condition.

12. A method as claimed in claim 11 wherein the predetermined condition is that the value of the fitness function is less than or equal to a predetermined value.

13. A method as claimed in claim 11 wherein the predetermined condition is that the value of the fitness function is greater than or equal to a predetermined value.

14. A method as claimed in claim 9 wherein the fitness function uses the kernel function.

15. A method as claimed in claim 6 further comprising performing kernel generalised discriminant analysis, kernel principal component analysis or kernel regression using the selected subset.

16. A method as claimed in claim 6 wherein individual elements of the data set comprise a plurality of measurements corresponding to a plurality of characteristics of the sensed items.

17. A method as claimed in claim 6 wherein the currency sensor is a document sensor.

18. A method as claimed in claim 17 wherein the document sensor is a banknote sensor.

19. A method as claimed in claim 6 wherein the currency sensor is a coin sensor.

20. A method as claimed in claim 6 wherein the kernel function is a Gaussian, polynomial, sigmoid, hyperbolic tangent or spline kernel.

21. A method of adapting a currency validator comprising storing a function derived in accordance with a method according to claim 6.

22. A method of classifying a currency item in a currency classifier comprising deriving at least one measurement of the item from at least one currency sensor, determining the value of a function derived in accordance with a method according to claim 6 and classifying the item according to the determined value.

23. A validator comprising means for sensing currency items to produce measured values representing characteristics of the items, means storing a function derived in accordance with a method according to claim 6, and means for validating a currency item using the measured values and the function.

* * * * *

UNITED STATES PATENT AND TRADEMARK OFFICE
CERTIFICATE OF CORRECTION

PATENT NO. : 6,899,215 B2
DATED : May 31, 2005
INVENTOR(S) : Gaston Baudat and Fatiha Anouar It is certified that error appears in the above-identified patent and that said Letters Patent is hereby corrected as shown below:

Title page,
Item [75], Inventors, replace "Geneva (CH)" with -- Geneve (CH) --;

Column 16,
Line 1, replace "often" with -- of the --.

Signed and Sealed this

Fourth Day of April, 2006

JON W. DUDAS
*Director of the United States Patent and Trademark Office*